United States Patent
Beguin

(10) Patent No.: US 8,949,353 B1
(45) Date of Patent: Feb. 3, 2015

(54) MESSAGING ACCOUNT SELECTION

(76) Inventor: Julien Beguin, Seattle, WA (US)

( * ) Notice: Subject to any disclaimer, the term of this patent is extended or adjusted under 35 U.S.C. 154(b) by 372 days.

(21) Appl. No.: 13/446,505

(22) Filed: Apr. 13, 2012

(51) Int. Cl.
*G06F 15/16* (2006.01)

(52) U.S. Cl.
USPC .......................................... 709/206

(58) Field of Classification Search
CPC ..................................................... G06F 15/16
USPC .......................................................... 709/206
See application file for complete search history.

(56) References Cited

U.S. PATENT DOCUMENTS

| | | | |
|---|---|---|---|
| 2007/0233777 A1* | 10/2007 | Bates et al. | 709/202 |
| 2008/0034432 A1* | 2/2008 | Bohannon et al. | 726/23 |
| 2012/0317213 A1* | 12/2012 | Zhang | 709/206 |
| 2013/0097526 A1* | 4/2013 | Stovicek et al. | 715/752 |

* cited by examiner

*Primary Examiner* — Shripal Khajuria
(74) *Attorney, Agent, or Firm* — Sutherland Asbill & Brennan LLP

(57) ABSTRACT

Described herein are techniques and systems for selecting a messaging account for transmission of a message. A request to send a message is received. The message is associated with one or more of a plurality of message accounts. Based at least in part on the association, one of the plurality of message accounts is selected to send the message. This selection may be free from user intervention.

18 Claims, 10 Drawing Sheets

MESSAGING ACCOUNT SELECTION

BACKGROUND

Users may have several messaging accounts, which are utilized for sending messages. When several messaging accounts are accessible to the user, confusion, inconvenience, or inattention may result in erroneous selection of a messaging account for use in transmission of a message. As a result, a message may be inadvertently sent from an incorrect messaging account.

DETAILED DESCRIPTION

Users send messages from more user devices such as smartphones, laptops, desktops, televisions, and so forth. For a variety of reasons, including but not limited to convenience, organization, compliance with legal or regulatory requirements, and so forth, users may have several messaging accounts. For example, the user may have a work email account, a personal email account, a home business email account, and so forth. Each of these messaging accounts may be used for different purposes, and in some cases, use of a particular account may convey various meanings or implications.

When several messaging accounts are accessible to the user, confusion, inconvenience, or inattention may result in erroneous selection of a messaging account for use in transmission of a message. As a result, a message may be inadvertently sent from an incorrect or otherwise undesired messaging account. This may result in miscommunication, noncompliance with operating procedures or regulations, and so forth. For example, a government employee may be required to use a government (work) related account which is subject to archiving and monitoring by the government when exchanging information about a government contract. By inadvertently sending a message from a personal messaging account rather than the work messaging account, the employee may inadvertently violate this requirement.

This disclosure describes systems and techniques related to selecting one message account from a plurality of message accounts to transmit a message. This selection may be fully automatic, or in some implementations involve confirmation or manual selection by the user. As described herein, one or more message attributes of the message are associated with one or more message account parameters. This association may include generation of a confidence level, which indicates how well the message corresponds to a particular message account. In one implementation, a message account with a highest confidence level and which is above a pre-determined threshold may be automatically selected. In another implementation, a message account with a highest relative confidence level may be automatically selected. The association may be improved over time using a variety of machine learning techniques such as probabilistic analysis, as well as manual user inputs.

Illustrative System

Figure 1:
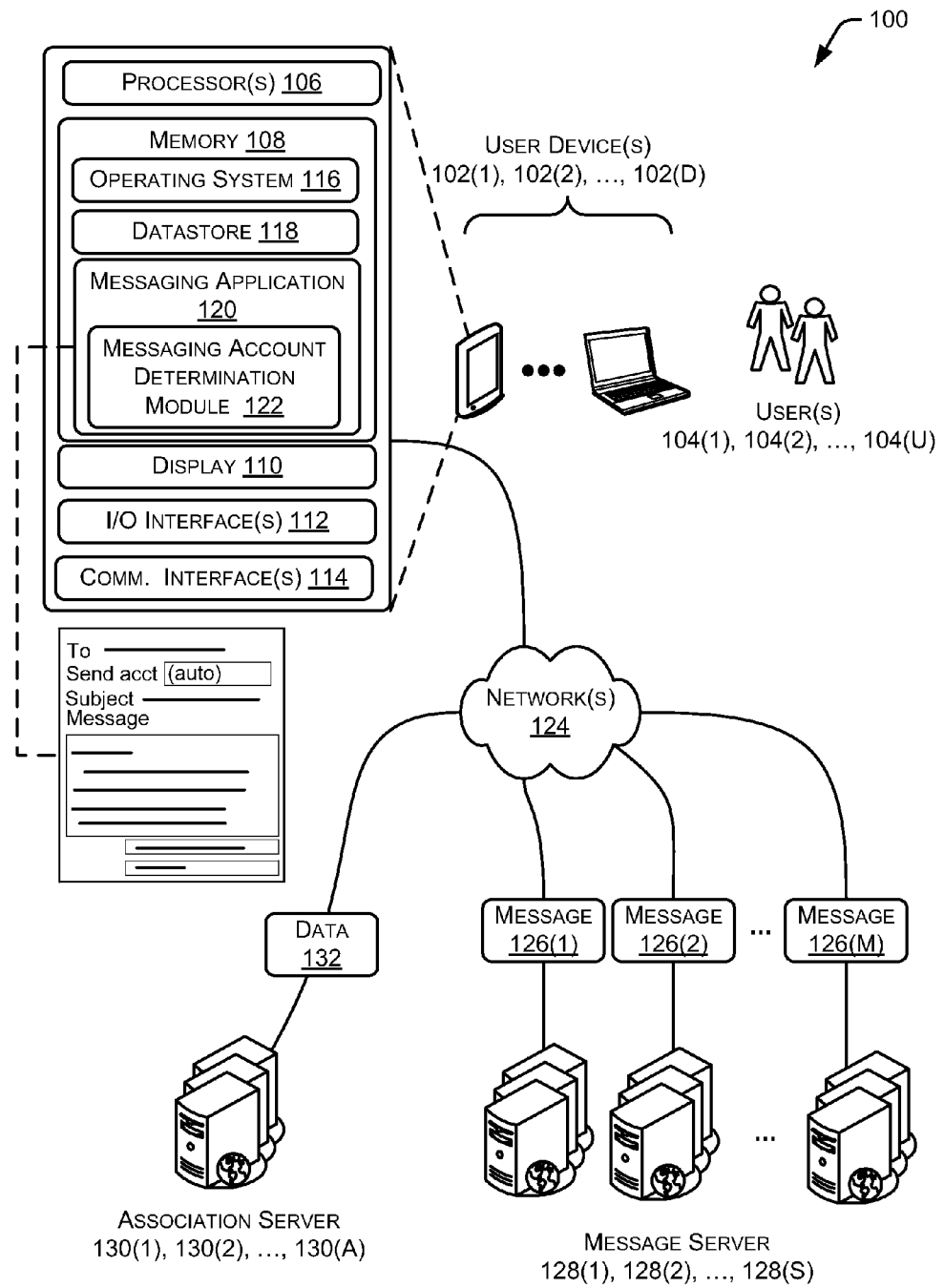
FIG. 1 illustrates a system for selecting a messaging account for transmission of a message in accordance with an embodiment of the disclosure.

FIG. 1 illustrates a system 100 for selecting a messaging account for transmission of a message. One or more user devices 102(1), 102(2), . . . 102(D) may be used by one or more users 104(1), 104(2), . . . 104(U). As used herein, letters enclosed by parenthesis such as "(U)" indicate an integer having a value greater than zero. The user devices 102 may include smartphones, laptops, desktops, tablet computers, televisions, set-top boxes, game consoles, in-vehicle computer systems, and so forth. The user devices 102 comprise one or more processors 106, one or more memories 108, one or more displays 110, one or more input/output ("I/O") interfaces 112, and one or more communication interfaces 114.

The processor 106 may comprise one or more cores and is configured to access and execute at least in part instructions stored in the one or more memories 108. The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The display 110 is configured to present visual information to the user 104. The display 110 may comprise a reflective or emissive display configured to present images, which appear to be two- or three-dimensional to the user 104. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 110 may be configured to present images in monochrome, color, or both. In some implementations the display 110 of the user device 102 may use emissive, reflective, or combination displays with emissive and reflective elements.

The one or more input/output interfaces 112 may also be provided in the user device 102. These I/O interfaces 112 allow for coupling devices such as keyboards, joysticks, touch sensors, cameras, microphones, speakers, haptic output devices, external memory, and so forth to the user device 102.

The one or more communication interfaces 114 provide for the transfer of data between the user device 102 and another device directly such as in a peer-to-peer fashion, via a network, or both. The communication interfaces 114 may include, but are not limited to, personal area networks ("PANs"), wired local area networks ("LANs"), wireless local area networks ("WLANs"), wireless wide area network ("WWANs"), and so forth. The communication interfaces 114 may utilize acoustic, radio frequency, optical, or other signals to exchange data between the user device 102 and another device such as an access point, a host computer, a router, a reader device, another user device 102, and the like.

The one or more memories 108 may store instructions for execution by the processor 106 to perform certain actions or functions. These instructions may include an operating system 116 configured to manage hardware resources such as the I/O interfaces 112 and provide various services to applications executing on the processor 106. The one or more memories 108 may also store a datastore 118 containing information about the operating system, messaging account information, messages, configuration files, and so forth. The datastore 118 and contents thereof are discussed below in more detail with regard to FIG. 2.

A messaging application 120 is stored in the one or more memories 108. The messaging application 120 may comprise an email client, short messaging service ("SMS") client, Internet browser, microblogging client, and so forth. The messaging application 120 is configured to provide messaging functionality. This functionality may include, but is not limited to, receiving and transmitting a message, accessing message data, accepting user input, and presenting a user interface, such as via the display 110 or another output device coupled to the I/O interface 112.

In some implementations, the messaging application may comprise a mail user agent. The messaging application 120 is configured to allow presentation of a plurality of message account indicators which designate messaging accounts configured to send messages. A messaging account determination module 122 is configured to select one or more of these messaging accounts to send the message. The messaging account determination module 122 may determine a confidence level associating the message with particular messaging accounts. The messaging account having the highest confidence level may be selected and used for transmission. The confidence level may be based at least in part on correspondence between the message and the messaging accounts. The messaging account determination module 122 may be configured to use one or more machine learning techniques to modify over time the calculation of the confidence level, selection of the messaging account, or a combination thereof. The machine learning techniques may include, but are not limited to, neural networks, associate rule learning, genetic programming, Bayesian networks, reinforcement learning, and so forth. This selection of the messaging account is discussed below in more detail with regard to FIGS. 2-5 and 8-9.

Once selected, the messaging application 120 may use the communication interface 114 to transmit via the network 124 one or more messages 126(1), 126(2), ..., 126(M) to one or more message servers 128(1), 128(2), ..., 128(S). The network 124 may comprise one or more private networks, public networks such as the Internet, or a combination of both configured to transfer data between two or more devices. The message 126 may comprise an email, SMS, microblog entry, text chat, video chat, audio chat, and so forth.

The messaging servers 128 may comprise individual servers, groups of servers, cloud resources providing messaging functionality, or a combination thereof. The messaging servers 128 are configured to receive and process the message 126 transmitted from the messaging application 120 of the user device 102. The processing may comprise storing, forwarding to one or more other messaging servers 128, executing a pre-determined action, providing the message to another user device 102 in response to a query, and so forth.

In some implementations the messaging account determination module 122 may be executed in whole or in part or otherwise supported by one or more association servers 130(1), 130(2), ..., 130(A) accessible via the network 124. The association server 130 may be configured to determine associations between messages and message accounts. Data 132 may be exchanged between the messaging application 120 such as on the user device 102, between the message servers 128, or both. For example, the association server 130 may be configured to receive aggregate message data about transfer of data between domains. This aggregate message data may be used to build associations, such as that email between domain "A.com" and domain "B.com" have a high confidence level of being personal email. Information about associations such as this may then be provided to the messaging account determination module 122 to be used at least in part for selection of the messaging account.

The user devices 102, the association server 130, or a combination thereof may be configured to maintain associational data, such as an association graph between users, domains, messaging accounts, and so forth. This associational data may be accessed by the user device 102, the message server 128, and so forth to determine a message account to be used for sending the message. These associations may be based on one or more factors and may be expressed as confidence levels, weights, probabilities, and so forth. The message accounts may comprise email boxes associated with a particular email address, text messaging accounts, short messaging service ("SMS") accounts, and so forth.

In one implementation, the association server 130 may be configured to act as a proxy or portion of the messaging application 120. In such an implementation, all message traffic to and from the messaging application, 120 a user 104 associated therewith may be assessed to determine associations suitable for use by the messaging account determination module 122.

While various functions are described above with respect to particular devices, it is understood that these functions may be distributed in many ways across the devices. In one implementation, the messaging application 120 and messaging account determination module 122 functionality may be provided at least in part by the user device 102. In another implementation, the user device 102 may access the messaging application 120 and the messaging account determination module 122 executing on the message server 128 or another server.

Figure 2:
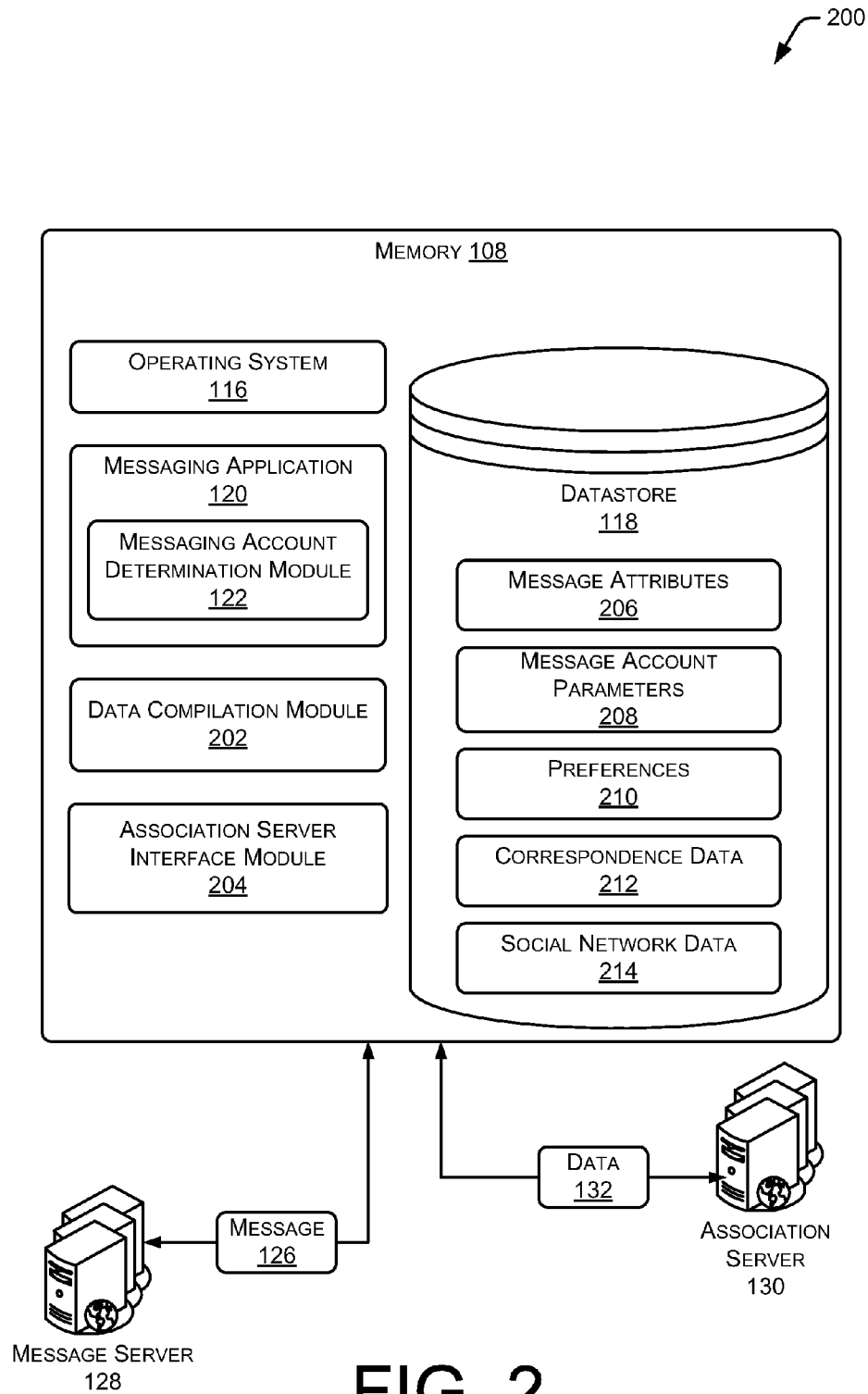
FIG. 2 illustrates a block diagram of modules in memory for the selecting the messaging account in accordance with an embodiment of the disclosure.

FIG. 2 illustrates a block diagram 200 of modules in the memory 108. As described above, the memory 108 in the user device 102 or another device such as the message server 128, the association server 130, or a combination thereof may include the operating system, the datastore, the messaging application, and the messaging account determination module.

The memory 108 may also include a data compilation module 202. The data compilation module 202 is configured to process data associated with creation, management, receipt, or transmission of messages 126. The data compilation module 202 may be configured to acquire data from the messaging application 120, from the message server 128, the association server 130, and so forth. For example, the data compilation module 202 may be configured to monitor user arrangement of messages 126 into organization groupings, such as file folders or categories. This information acquired by the data compilation module may then be used by the messaging account determination module 122 to determine what messages are to be associated with particular message accounts. The data compilation module 202 may be configured to acquire information, which is user 104 specific, aggregated across a plurality of users 104(U), or a combination thereof. Information may be acquired through application programming interfaces, logging, proxy services, and so forth.

In some implementations, the data compilation module 202 may acquire information from or about other applications. For example, the data compilation module 202 may be configured to interrogate the operating system 116 to determine what applications have recently had user focus. This data may be used to provide additional information to associate messages with particular messaging accounts. Thus, data that a dedicated business application for managing government bids was open contemporaneously as the email was sent may be used to associate the email with a work messaging account.

An association server interface module 204 may also be present in the memory 108. The association server interface module 204 is configured to exchange data 132 with the association server 130. For example, the association server interface module 204 may send data 132 summarizing associations made by the messaging account determination module 122 to the association server 130. This information may be received by the association server 130 and used to generate more detailed associative models, either individual to the user 104 or general for groups of users. Likewise, the messaging account determination module 122 of the user device 102 may provide data 132 to the association server and receive in return association data for use in selection of the messaging account. As mentioned above, in some implementations the association server 130 may provide at least part of the functionality of the messaging account determination module 122.

One or more message attributes 206 may be stored in the datastore 118. The message attributes 206 contain information about messages 126, which have been sent, received, or both. The attributed may include source or destination message address, date/time sent, location sent from, content of the message, and so forth. The messaging account determination module 122 may use the message attributes 206 to determine which messaging account to select. The message attributes 206 are discussed below in more detail with regard to FIG. 3.

One or more message account parameters 208 in the datastore 118 comprise data about the message accounts. This data may include message address, user specified categories, message server, connection information, and so forth. The messaging account determination module 122 may use the message account parameters 208 to determine which messaging account to select. The message account parameters 208 are discussed below in more detail with regard to FIG. 4.

Preferences 210 may be stored in the datastore 118. These preferences 210 may include user-specified confidence level thresholds for automatic selection, pre-determined exceptions to automatic selection, and so forth.

Correspondence data 212 is information relating one or more message attributes to one or more message account parameters 208. The correspondence data 212 may be maintained as lists, databases, graphs, and so forth. The correspondence data 212 may comprise various relationships such as weightings between the message attributes and the message account parameters 208. In some implementations, the correspondence data 212 may comprise a previously determined confidence level.

The datastore 118 may maintain social network data 214 which relates a particular user 104 or group of users 104 with one another. For example, the social network data 214 may indicate that Winston is acquainted with Frank who is in turn acquainted with Henry. This social network may be reflective of personal, educational, professional, or other affiliations.

While the datastore 118 is shown in the memory 108 of the user device 102, in some implementations at least a portion of the datastore 108 or information therein may be stored on other devices. For example, the social network data 214 may be stored on a social network server.

Figure 3:
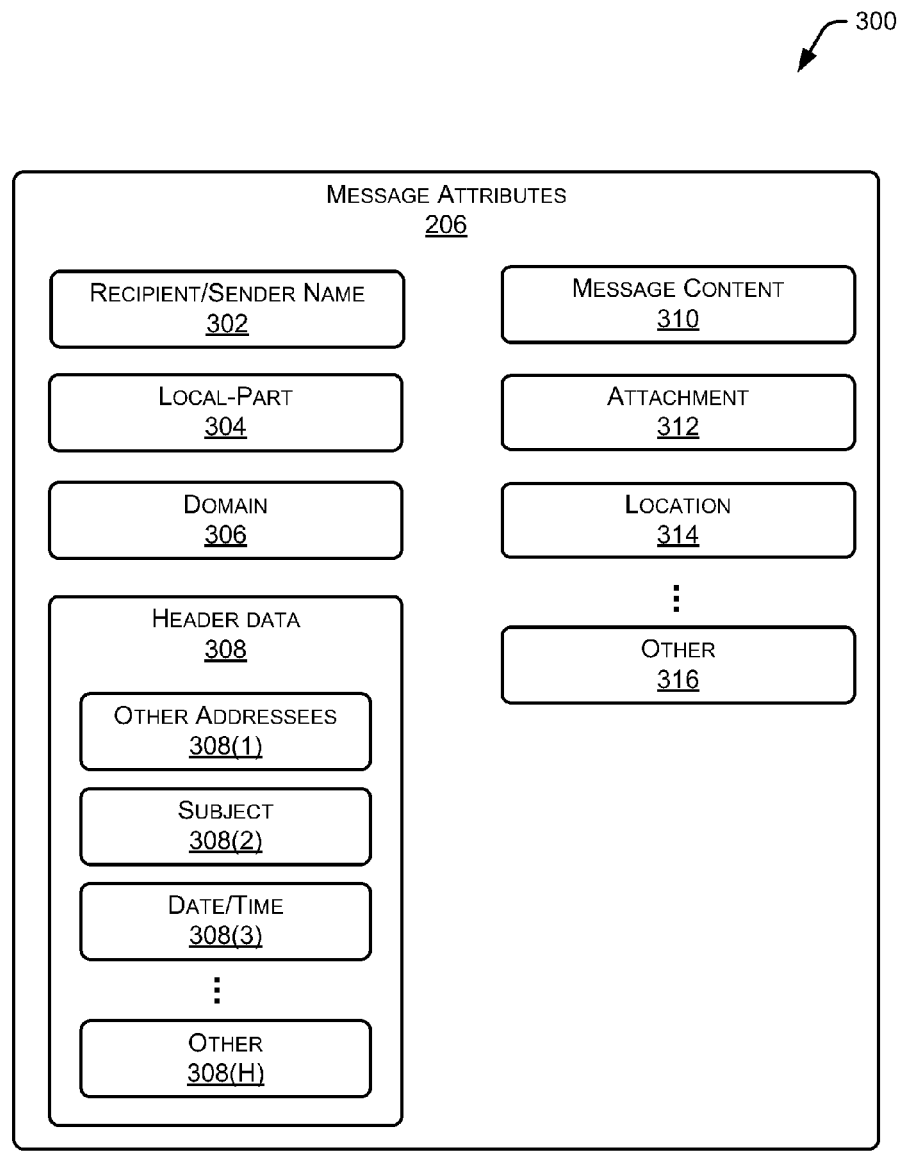
FIG. 3 illustrates a block diagram of message attributes in accordance with an embodiment of the disclosure.

FIG. 3 illustrates a block diagram 300 of the message attributes 206. The message attributes 206 contain information about messages 126, which have been sent, received, or both. A recipient/sender name 302 indicates a name of the user 104 or entity associated with the message. This recipient/sender name 302 may be used to associate the message 126 with stored contact information, such as in the datastore 118. This contact information may comprise data suitable for determining a correspondence between the message and one of the plurality of messaging accounts. For example, where the contact information indicates the user has a job title of "President" messages sent to such contacts may be associated more highly with a work message account.

Information about a sender in the case of a received message or a recipient in the case of a sent message may be stored and used by the messaging account determination module 122. This information may comprise a local-part 304 of an address, such as the name of a particular user on the message server 128, as well as a domain 306, which is used to designate an organization group of one or more message servers 128. Associations using the domain 306 may be relatively broad while those using the local-part 304 and the domain 306 may be more specific. For example, an email message 126 sent to "Hank@A.com" may be associated with a personal message account because messages to the "A.com" domain 306 have a high probability of being associated with the personal message account. The local-part 304 may provide specificity which results in a different association. Continuing the example, messages specifically addressed to "Hank@A.com" may be associated with a work account due to a high probability that the particular account "Hank@A.com" is associated with work-related messages.

Header 308 comprises header information associated with the message 126. This may include, but is not limited to other addressees 308(1), subject line 308(2), date/time 308(3) created, opened, read, or a combination thereof, or other 308(H). In some implementations additional data may be included in the header 308, or presented separate from the header 308.

The other addressees 308(1) provide information about other recipients who were included in distribution of the message 126. For example, the other addressees 308(1) may be entries into the "to," "cc," and "bcc" fields in an email. The other addressees 308(1) may be used by the messaging account determination module 122 to associate the message with a particular message account. For example, where a majority of recipients in the "cc" field are in the same domain 306 as the sender, the message may be associated with the corresponding message account in the same domain 306.

The subject 308(2) field of the message 126, such as in an email, may be used by the messaging account determination module 122 to associate the message 126 with a particular message account. For example, where the subject contains the words "Lease Proposal" it may be more closely associated, such as with a higher weight or probability, with a message account used for work emails than with a message account used for personal emails. In another example, the word "party" may be more closely associated with a message account for personal emails, while the words "golf equipment" may be lightly associated with both work and personal accounts.

The date/time 308(3) at which the message 126 is created, opened, read, or a combination thereof may also be stored in the message attributes 206 in the datastore 118. This information may be used as part of the association process of the messaging account determination module 122. For example, messages 126 created outside of working hours of 8:00 a.m. to 5 p.m. local time may be associated more closely with message accounts used for personal email.

The other 308(H) header data may also include a message identifier, precedence, trace information, and so forth. For example, the trace information in an email message sent using simple mail transfer protocol ("SMTP") might be used to validate a sending server for a received message. Once validated, that received message may be given greater weight by the messaging account determination module 122 during association than a non-validated message.

The message attributes 206 may also include message content 310 of the message 126. The messaging account determination module 122 or another module may analyze the message content 310 for keywords or phrases, semantic content, abbreviations, and so forth. For example, the message content 310 comprising the words "BBQ" and "ROFL" may be considered more casual conversation and thus associated with message accounts used for personal messages. The message content 310 may be stored, or in some implementations a digest, summary, hash, or a combination thereof may be generated.

Attachments 312 to the message 126 or information associated therewith may also store in the message attributes 206 for analysis by the messaging account determination module 122. This information may include contents of the attachment or metadata about the attachment. For example, where the attachment comprises a text file, the text therein may be assessed by the messaging account determination module 122 to determine an association of the message 126 to one of the message accounts. In other implementations, the messaging account determination module 122 may use metadata of the attachment such as a file name, file extension, and so forth. For example, messages 126 with pictures attached may be more closely associated with a message account used for personal messages.

A location 314 may comprise data about relative locations (such as in the user's office, in the break room) or geographic locations (such as latitude and longitude). The messaging account determination module 122 may associate messages from a particular location such as the break room more closely with a personal message account compared to messages sent from an office.

Other 316 message attributes may also be stored, such as encryption status, telephone number, length of message, whether the message 126 was sent or received by the messaging application 120, and so forth. For example, the messaging account determination module 122 may be configured to assign different levels association between messages, which have been sent or received. Thus, a message sent by the user 104 may be assigned a high association while a message received is assigned a low association. One or more of these message attributes 206 may be used by the messaging account determination module 122 in conjunction with the message account parameters 208 described below with regards to FIG. 4 to select a message account for sending a message.

In some implementations, the datastore 118 may retain historical data about the message attributes 206 for use by the messaging account determination module 122 or other modules. For example, the message attributes 206 may contain data that messages 126 to the message servers 128 of "E.gov" domain are historically sent from a particular message account associated with "C.gov" domain. This data may be acquired by the data compilation module 202, provided by the message server 128, and so forth. The messaging account determination module 122 may use this message history 206 at least in part to determine an association between a message and a particular message account.

Figure 4:
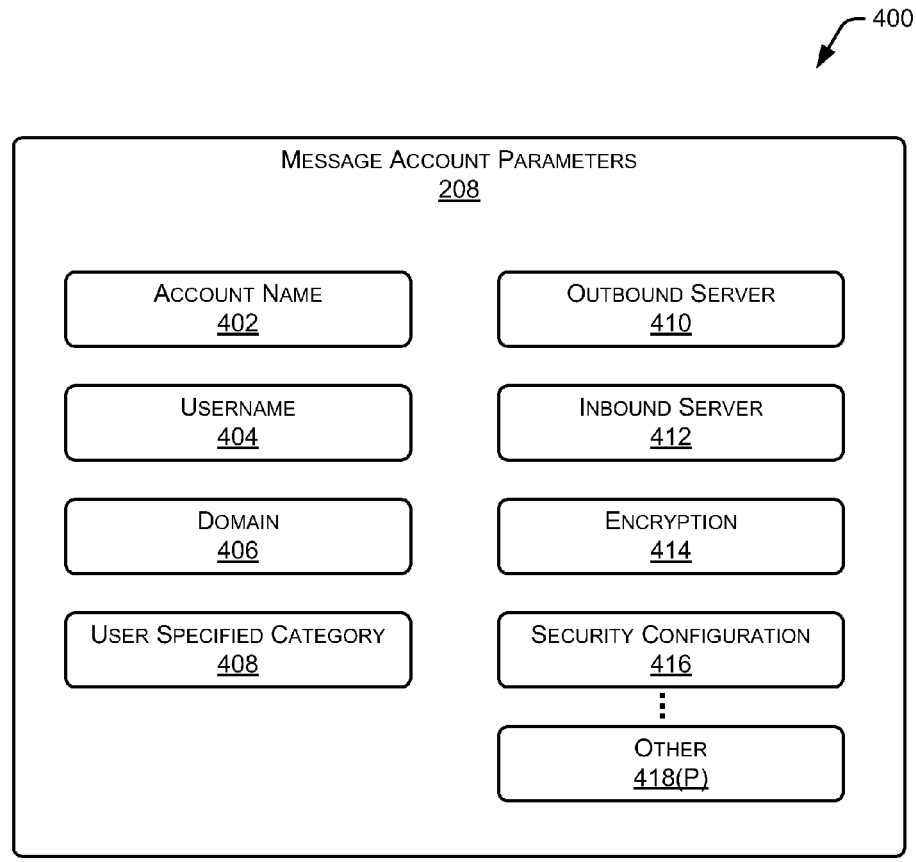
FIG. 4 illustrates a block diagram of message account parameters in accordance with an embodiment of the disclosure.

FIG. 4 illustrates a block diagram 400 of the one or more message account parameters 208, which comprise data about the message accounts used to send the messages 126. These message account parameters 208 may include an account name 402. This account name 402 may be manually or automatically generated. For example, during configuration of the message account on the user device 102, the user 104 may specify the account name 402.

A username 404 may be stored as well as a domain 406. The username 404 may be used to designate a particular user in a message system while the domain 406 designates an organizational group of one or more message servers 128. For example, the username 404 and domain 406 combination of "W@D.gov" indicates user "W" on the messaging system associated with the "D.gov" domain. In some implementations the domain 406 may be omitted. For example, where users are part of a unified administrative framework including, but not limited to, a chat session, single service logon, and so forth.

The message account may have a user specified category 408. This user specified category 408 may be pre-determined or arbitrary. A pre-determined user specified category 480 may comprise a listing of possible message account categories such as "work," "personal," "home business," and so forth from which the user 104 may select and designate an account. For example, a user Winston or a system administrator may designate Winston's account of "W@D.Gov" as being a "Work" account. These categories 408 may be used by the messaging account determination module 122.

An outbound server 410 may be specified, indicating the message server 128 or group of message servers 128 for transmitting and otherwise processing the message 126. An inbound server 412 indicates the message server 128 or group of message servers 128 which messages 126 are received from or otherwise accessed. In some implementations, the outbound server 410 and the inbound server 412 may be provided by the same messaging server 128 or group of messaging servers 128. Additionally, the outbound server 410, the inbound server 412, or both may specify one or more protocols for operation. For example, the outbound server 410 information may include the address of the messaging server 128 as well as a requirement to communicate with that outbound server 410 using secure sockets layer ("SSL") or transport layer security ("TLS") encryption.

Encryption 414 data in the message account parameters 208 specifies presence of encryption, encryption techniques, protocols, procedures, bit strength, and so forth as applied to the message content 310. For example, the encryption 414 data may specify that the message and any attachments 312 are to be encrypted using the Advanced Encryption Standard ("AES") with a 256 bit key. Details in the encryption 414 data may be used by the messaging account determination module 122 to associate the outbound message 126 with a particular message account. For example, encrypted email may highly correspond to messages sent by the "D.gov" domain.

Security configuration 416 information such as whether the messaging application 120 requires login prior to working with messages, policies for scanning outbound attachments to redact metadata, and so forth may also be stored and considered during selection of the message account. Other 418(P) message account parameters 208 may also be stored and used by the messaging account determination module 122 or other modules.

Figure 5:
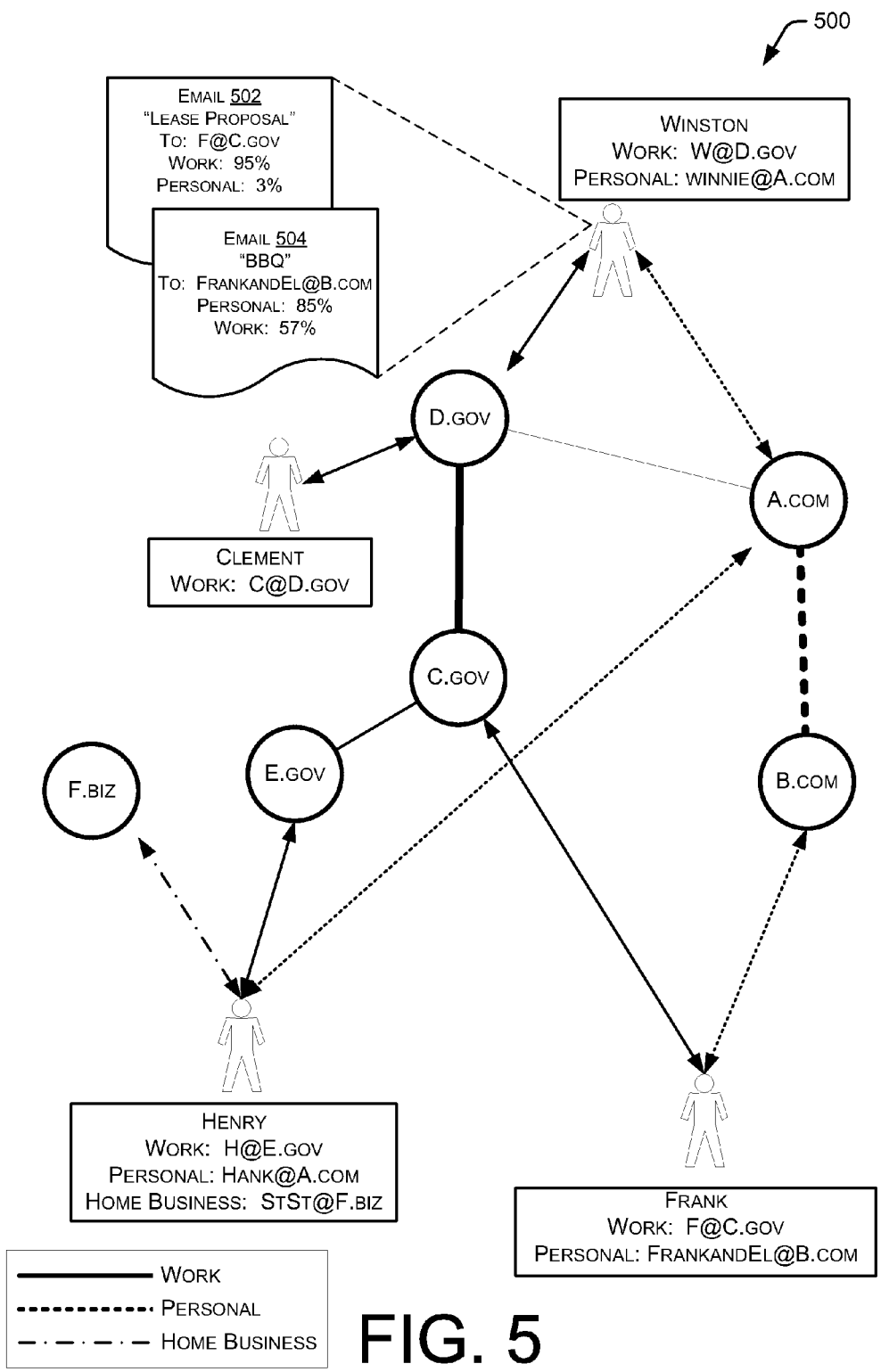
FIG. 5 illustrates various associations between messages and message accounts in accordance with an embodiment of the disclosure.

FIG. 5 illustrates various associations 500 between messages and message accounts. Associations described herein, may be determined based on manual input, information derived from social networks, or determined based at least in part on analysis of message traffic, such as between the message servers 128. In one implementation, probabilistic analysis of traffic between users may be used to derive the associations described herein. These associations may be used by the messaging account determination module 122 or other modules to select a message account for sending a message.

For the sake of illustration and not by way of limitation, the following examples depict the messages 126 as emails. It is understood that in other implementations other messaging such as SMS, video chat, and so forth may be used. In this diagram, solid lines indicate a "work" affiliation, a broken line indicates a "personal" affiliation, and a broken line interspersed with dots indicates a "home business" affiliation. These designations of "work," "personal," and so forth are understood to be for convenience only and not by way of limitation. In this illustration, the relative thickness of the line indicates a strength of association. For example, thicker lines indicate a greater degree of association while thinner lines indicate a lesser degree. The associations may be unidirectional, or multi-directional relative to a particular message account. For example, a message association may be strong from A.com to B.com but weak from B.com to A.com.

In this illustration four users 104 named Winston, Clement, Frank, and Henry are shown. Each of these users has one or more user devices 102 which they each use to access their messaging accounts. Shown here are six domains each providing message accounts and services such as the message servers 128. The six domains depicted are A.com, B.com, C.gov, D.gov, E.gov, and F.biz. Functionally, these domains or their underlying message servers 128 may exchange messages between one another. Thus, A.com may send and receive messages to F.biz, and so forth.

For this illustration, assume Winston uses his user device 102 such as a laptop to run the messaging application 120, such as a mail client. Winston's messaging application 120 is configured with two messaging accounts including a "work" account, which is provided by the D.gov domain, and a "personal" account provided by the A.com domain. Winston may thus send an email using his work or his personal account. As shown here, Winston is thus affiliated with the A.com and the D.gov domains.

Clement has a single messaging account, that of "C@D.gov" which is designated as "work." Frank has two messaging accounts, "FrankandEl@B.com" for personal matters and "F@C.gov" for work. Frank is thus affiliated with the B.com and the C.gov domains. Finally, Henry has three accounts: "H@E.gov" for work, "Hank@A.com" for personal use, and "StSt@F.biz" for a home business.

As illustrated here, Winston has two emails to send, both to Frank. A first email 502 has been assessed by the messaging account determination module 122. Confidence levels have been assigned which describe correspondence between the message to be sent and the one or more message accounts. Confidence levels may be assessed in some implementations for each combination of message and message account. As shown here, the email 502 titled "Lease Proposal" shows a high-confidence (95%) that it is associated with the work account and a low confidence (3%) that it is associated with the personal account.

In comparison, a second email 504 has been by the messaging account determination module 122. This email 504 titled "BBQ" shows a high confidence 85% that it is associated with a personal messaging account and a lower confidence of 57% that this is associated with Winston's work messaging account "W@D.gov."

When Winston is preparing his emails 502 and 504 to send, the messaging application 120 uses the messaging account determination module 122 to select a message account to use in the transmission of the email. For example, by looking at the destination domain "C.gov" in the email 502 to be sent, a correspondence between email message and the work message account of "W@D.gov" may be determined, and the work message account selected for sending the email. In contrast, the A.com and the B.com may be determined to be strongly associated, and that association may be such that the messaging account determination module 122 may use the personal email account for messages to the B.com domain. Thus, Winston's email 504 to FrankandEl@B.com may be sent via the message account for A.com.

The association server 130, the messaging account determination module 122, or a combination thereof may be configured to acquire information from a plurality of the users 104(U), the message servers 128(S), or a combination thereof to develop information about associations between the message servers 128(S), the users 104(U), or both. This information may be anonymized or aggregated to maintain confidentiality of user information. For example, an analysis of message attributes 206 of traffic between the message servers 128 of domain A.com and B.com may indicate that traffic between these two is strongly associated with personal communications. As a result, messages 126 originating with or destined for these domains may exhibit a higher confidence level for message accounts designated for non-business. Likewise, traffic between the D.gov and C.gov domains is strongly associated with work communications. In contract, traffic between the A.com domain and the D.gov domain is lightly associated with work communications.

Figure 6:
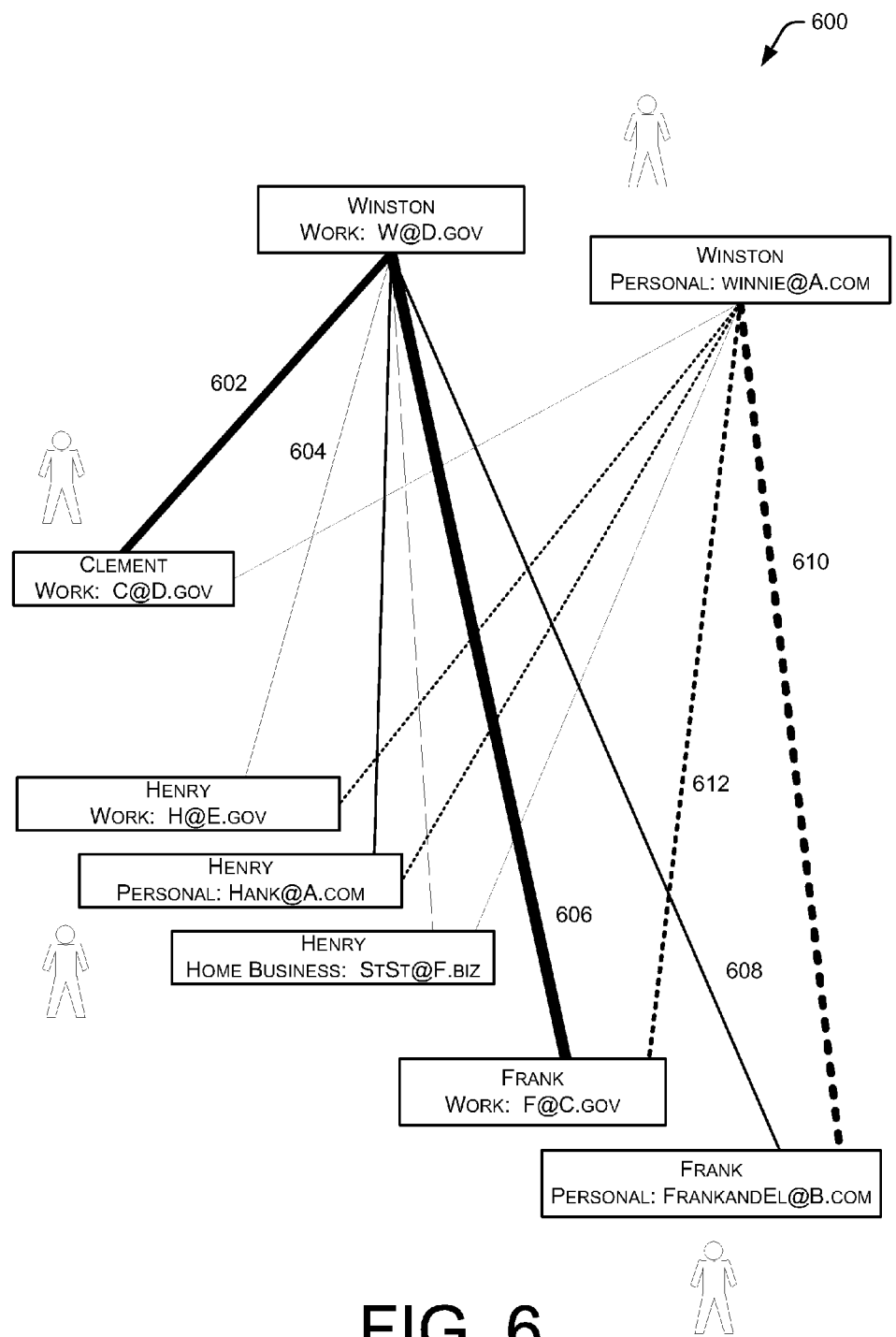
FIG. 6 illustrates various associations between message accounts in accordance with an embodiment of the disclosure.

FIG. 6 illustrates various associations 600 between message accounts. As described above, each user may have one or more message accounts. In some implementations, the association server 130, the messaging account determination module 122, or a combination thereof may be configured to maintain association information between message accounts. In this illustration, the relative thickness of the line indicates a strength of association. For example, thicker lines indicate a greater degree of association while thinner lines indicate a lesser degree. The associations may be unidirectional, or multi-directional relative to a particular message account. For example, a message association may be strong from Winston to Clement but weak from Clement to Winston.

For ease of illustration, and not by way of limitation, the illustration 600 indicates relative strength or magnitude of associations between the two accounts of the user Winston and the other message accounts in this example. In some implementations associations may be maintained for a selected subset of message accounts. The following associations, and the strength thereof, may be determined based on activity between the users depicted, or based at least in part upon the activity of other users.

Association 602 between Winston's work account and Clements work account shows a medium association. For example, this association may consider that Winston frequently uses the work account to send messages to Clement, and also that Winston and Clement share a domain (D.gov). In comparison, association 604 is a light association between Winston's work account and Henry's work account. Association 606 indicates a strong association between the work message accounts of Winston and Frank. For example, Winston and Frank may often correspond on work related matters. Association 608 between Winston's work message account and Frank's personal message account is low. For example, Winston may occasionally send emails from his work message account but intend for them to be read by Frank when at home. Association 610 is another strong association between Winston's personal account and Frank's personal account. Association 612 between Frank's work message account and Winston's personal message account is medium strength.

As this figure illustrates, a variety of associations between messaging accounts may be maintained by the association server 130, or by other devices described herein. These associations may be used to determine a confidence factor associated with a particular message 126 should that message be sent by one of the messaging accounts.

Illustrative User Interface

Figure 7:
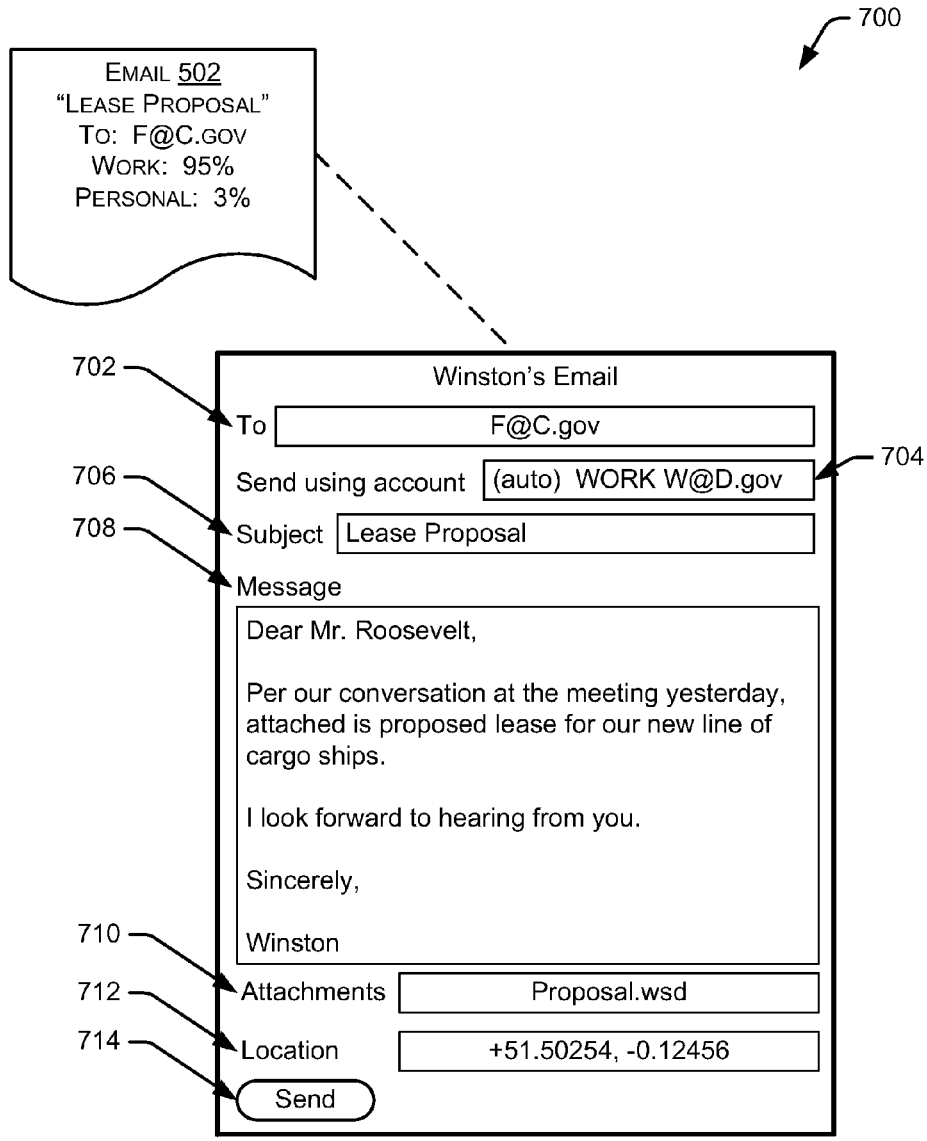
FIG. 7 illustrates a user interface of a messaging application selecting a first messaging account in accordance with an embodiment of the disclosure.

FIG. 7 illustrates a user interface 700 of the messaging application 120 such as in the situation described above with regard to FIG. 5. Here we see the user interface 700 as the user Winston is entering his email 502. The user is presented with several controls or input fields to enter various message attributes 206 such as a destination address 702, presentation of a message account indicator 704 designating the automatically selected message account, subject 706, message content 708, attachments 710, and location 712. A send control 714 configured to initiate transmission of the message 126 is also presented. In other implementations some user interface elements shown here may be omitted, other user interface elements added, or a combination thereof.

As described above, the messaging account determination module 122 may use one or more of the message attributes to determine correspondence with a particular messaging account. For example, the destination address, subject, formal formatting of the message content including signature, attached file having an extension associated with a document, and a location associated with work results in generation of a high confidence level with respect to this message being sent from the work account.

The user interface 700 may configured such that the messaging account determination module 122 selects the message account for transmission at the conclusion of a message such as indicated by the user initiating a control 714 to send the email, or may be updated during the user's interaction with the user interface 700. For example, as the to address, subject, message, attachments, and other message attributes 206 so forth are input the selected account may change based on this input. As a result, during composition of the message, the "send using account" value may change. This update may occur based on time, data entry, and so forth. For example, the update may be configured to take place upon user entry of a space or return character on a keyboard.

In some implementations one or more interface attributes associated with the user interface 700 may be configured to adjust at least partly in response to changes in selection of the messaging account. These interface attributes may include background color, border color, animations, graphics, font, style, and so forth. For example, when an account designated as a personal account is selected, a background of the user interface may be set to green. Likewise, when the account designated as work is selected, the background may be presented as red. In another implementation, the style of the font used during message composition may change based at least in part upon the messaging account selected. The selection of the messaging account may be automatic or manual. For example, the user may manually select or have provided as a default a work messaging account. At least partly in response to this selection, the user interface 700 may be configured to change interface attributes, such as presenting a red border.

These changes in the interface attributes may be made during or as a result of entry of data into the user interface 700. In one implementation, where the confidence criteria to select a send message account are unsatisfied, below a threshold value, or ambiguous, a pre-determined set of interface attributes may be used. For example, a plain white background with a serif font may be used to provide visual feedback that no message account has been selected, or that the selection is ambiguous. In some implementations these interface attributes may be used to affect formatting of the message as sent. For example, an email sent using a particular messaging account may have a particular font size and style selected.

Message signatures may also be selected based at least in part on the send message account which has selected. For example, the message shown here by Winston which has been determined to be sent using the "WORK" account may include an automatically inserted or appended signature "Winston Spencer, Prime Minister."

Figure 8:
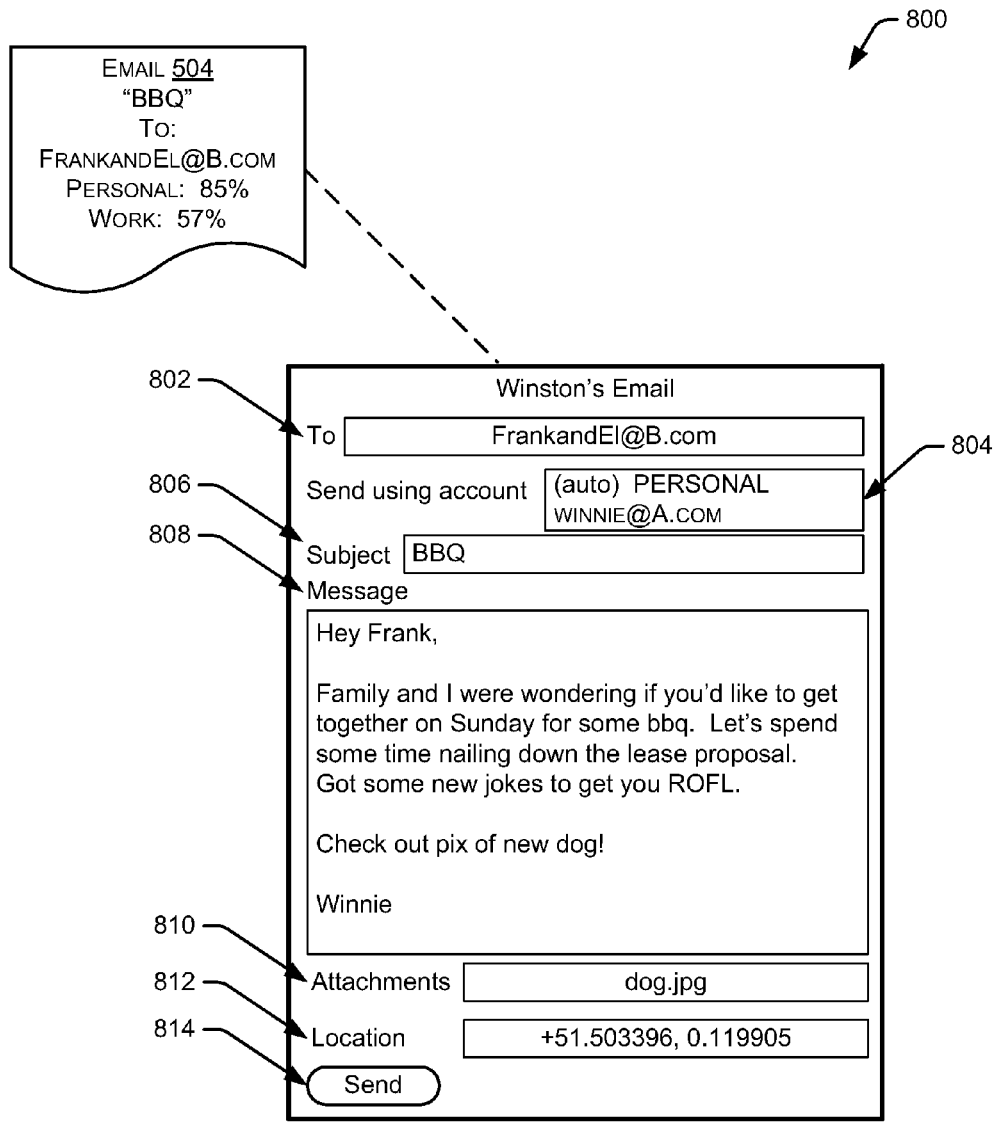
FIG. 8 illustrates a user interface of a messaging application selecting a second messaging account in accordance with an embodiment of the disclosure.

FIG. 8 illustrates a user interface 800 of the messaging application 120 for the email 504. In this example, the association is more casual. The destination address 802 is to a mail provider 128 associated with personal emails, a message account indicator 804 indicates automatic selection of the message account, while a subject 806 entry uses a term "BBQ" which has not previously appeared with frequency above a particular threshold in other messages sent from using the message accounts associated with work. A body 808 of the message contains an informal salutation as well as use of slang such as "ROFL" and "pix." An attachment 810 is a picture, which is also less frequently associated with messages sent from the work message account. Likewise, the location 814 is one associated with the user Winston's home location. As a result, this message may be determined by the messaging account determination module 122 to have a high confidence level of 85% that the personal messaging account is associated with this message and is to be selected, compared to the work messaging account, which has a relatively low 15% confidence level.

Illustrative Process

Figure 9:
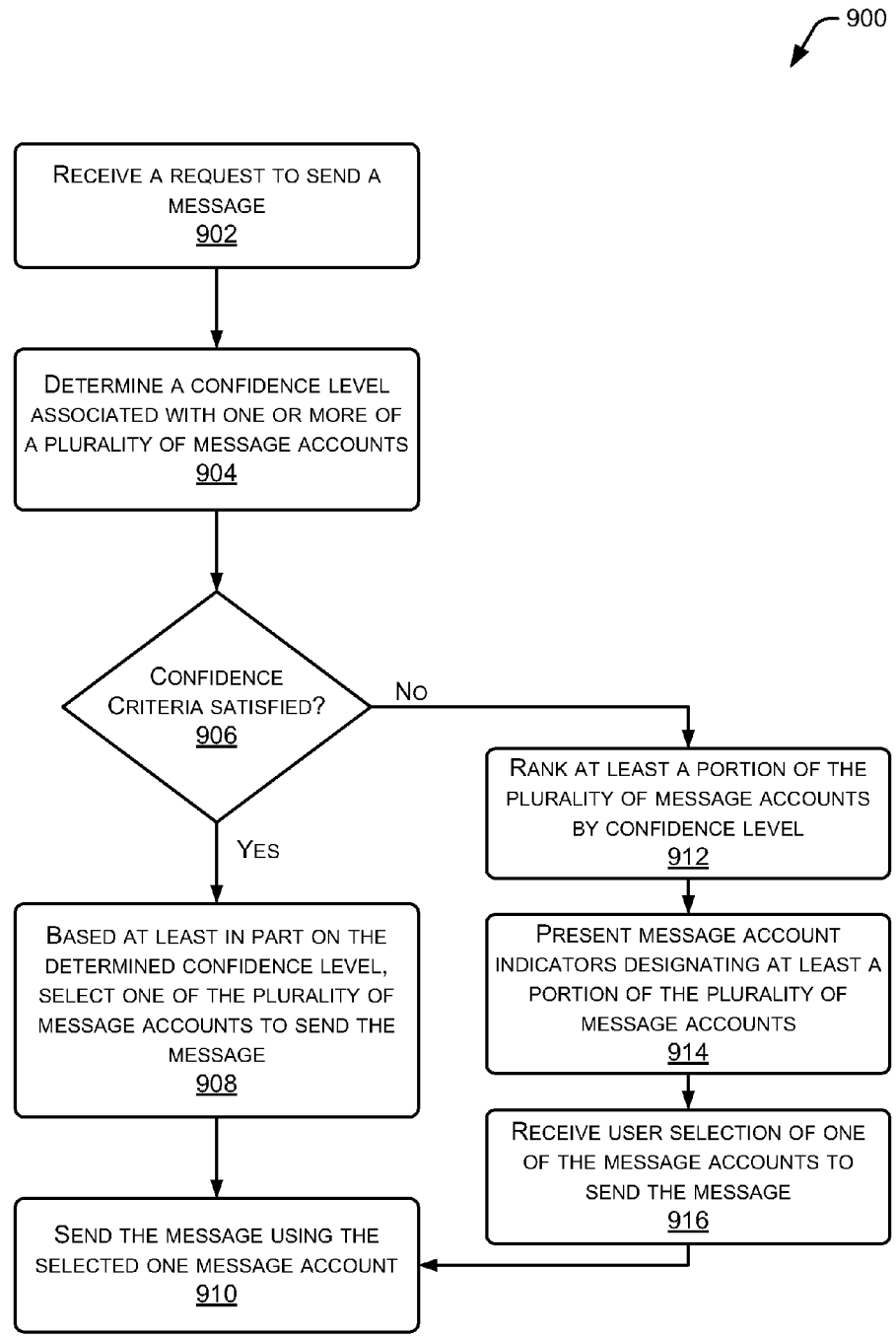
FIG. 9 illustrates a flow diagram of a process of sending a message with a selected message account in accordance with an embodiment of the disclosure.

FIG. 9 illustrates a flow diagram 900 of a process of sending a message with a selected message account. This process may, in some implementations, be performed at least in part by the messaging application 120, the messaging account determination module 122, and so forth.

Block 902 receives a request to send a message 126. For example, the user 94 may select a control to send an email message. In another example, the user may select a control to compose a message. As described above, in some implementations the message 126 may comprise an email.

Block 904 determines a confidence level for the requested message as associated with one or more of a plurality of message accounts. This confidence level describes a correspondence between at least a portion of one or more message attributes and one or more message account parameters of the plurality of message accounts. This correspondence may be probabilistic, heuristic, pre-defined, and so forth based at least in part on the associations and data described above. For example, data in the datastore such as the relationships between people as described in the social network data 214 may be used to determine a confidence level associated with one or more of the plurality of message accounts.

As described above, in some implementations the messaging account parameters may comprise data associated with an email service provider. In some implementations the determination of the confidence level may retrieved, such as from the association server 130 via the association server interface module 204.

Block 906 determines when the confidence level satisfies one or more criteria such as meeting pre-determined thresholds. The thresholds may be determined automatically or at least in part by manual input and may be absolute or a relative. In one example with an absolute threshold, the user 104 may specify that automatic selection for a particular messaging account such as a work message account must have a minimum of 90% confidence level in order to be selected.

In another implementation, a relative threshold may be configured such that automatic selection calls for exceeding a confidence level of another account by a pre-determined margin. For example, selection of the work message account may call for a minimum of 75% confidence level and exceeding other confidence levels by 10%. Thus, where the work message account shows a 95% confidence level with the message and the personal message account shows a 84% confidence level with the message, the work message account would be selected as it exceeds the minimum threshold and the relative margin. It is appreciated that a variety of different confidence criteria may be established. For example, the criteria may comprise confidence level associated with one message account meeting or exceeding by a factor of two other confidence levels. These confidence criteria may be automatically generated or manually input. For example, the manual input may comprise the user 104 specifying one or more confidence levels associated with selection of a particular messaging account.

When the confidence level criteria are satisfied, the process proceeds to block 908. Block 908, based at least in part on the determined confidence level, selects one of the plurality of message accounts to send the message. This selection may be based on identifying the message account having the confidence level which satisfies the confidence criteria. For example, with regards to email 502 as described above, the confidence level of 95% results in selection of the work messaging account using the D.gov domain messaging servers 128.

In some implementations, a plurality of message accounts may be selected to send the message. For example, different confidence levels may be determined based upon the relationship between message accounts of the sender and the recipient. Suppose Henry is sending messages with regards to his home business. A message sent via Henry's home business messaging account of "StSt@F.biz" may be determined to have a lower confidence level than the same message sent via Henry's personal messaging account of "Hank@A.com." Stated another way, the confidence level may consider the recipients perspective in the message transaction. In one implementation, this may be derived from social network data 214. For example, Winston and Henry may be designated as colleagues on a social network website. This, combined with a common domain of A.com may result in a higher confidence level being assigned to use that messaging account.

Block 910 sends the message 126 using the selected message account. For example, the messaging application 120 may send the message 126 via a network interface device of the communication interfaces 114.

Returning to block 906, when the confidence criteria are not satisfied, such as when the confidence levels are less than or equal to a pre-determined threshold or outside of a pre-determined margin, the process may proceed to block 912. Block 912 ranks at least a portion of the plurality of message accounts by confidence level. Block 914 presents message account indicators designating at least a portion of the plurality of message accounts via a user interface. This presentation may be sorted by ranking, such that message accounts with the greatest confidence levels appear first. For example, in the case of the email 504, the user 102 may be presented in the user interface with a list showing the message account indicators "PERSONAL" and "WORK" in that order to correspond to the underlying message accounts which have 85% and 45% respective confidence levels determined for each with respect to the message 126.

Block 916 receives a user selection of one of the plurality of message accounts to send the message, and may proceed to 910 to send the message using the selected account. Block 916 may also provide this user selection information back to a machine learning module to further train the messaging account determination module 122 as to what messaging account should have been selected.

Figure 10:
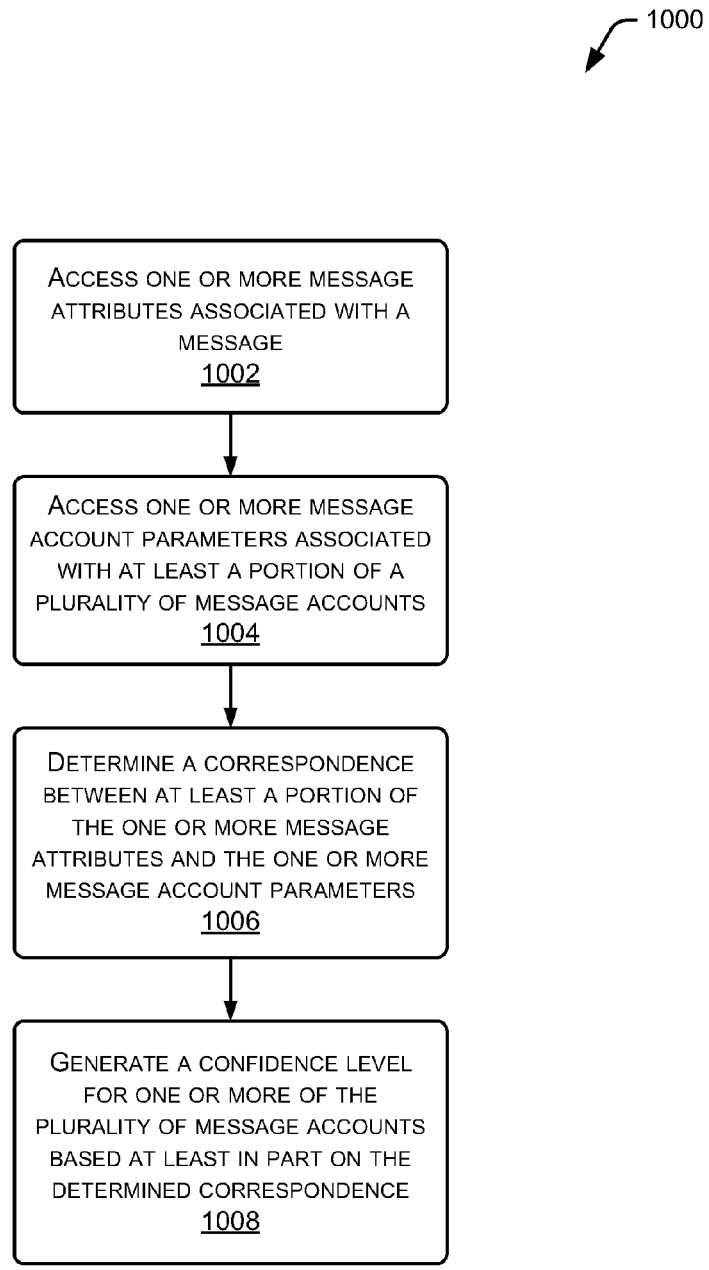
FIG. 10 illustrates a flow diagram of a process of determining a confidence level in accordance with an embodiment of the disclosure.

FIG. 10 illustrates a flow diagram 1000 of a process of determining the confidence level between the message and the plurality of messaging accounts. The messaging account determination module 122, the association server 130, or a combination thereof may determine the confidence level.

Block 1002 accesses one or more message attributes 206 associated with the message. This data may have been previously stored. For example, the local-part 304 and the domain 306 indicating the intended recipient may be accessed as well as the header data 308. In some implementations, historical data may be accessed as well, such as a previously received manual selection of a message account for a prior message.

Block 1004 accesses one or more message account parameters 208 associated with at least a portion of the plurality of message accounts. This data may have been previously stored. For example, the domain 406 associated with the plurality of message accounts.

Block 1006 determines a correspondence between at least a portion of the one or more message attributes 206 and the one or more message account parameters 208. Multiple correspondences between several message attributes 206 and the message account parameters 208 may occur sequentially, contemporaneously, or both. For example, the domain 306 of the recipient matches or is affiliated with the domain 406 of one of the messaging accounts while the text in the subject 308(2) is affiliated with another of the messaging accounts.

This correspondence may be determined using manual inputs, historical data, machine learning modules as so forth. For example, upon initial use, the messaging application 120 may retrieve from the association server 130 via the association server interface module 204 a basic set of associations between message servers 128, domains, and so forth. This basic set may be determined using aggregated or anonymized data and may be generic across all users, specific to users having a particular profile or demographic or customized based on a set of initially specific conditions such as a survey to the user 104. Over time, as the user 104 manually selects a particular messaging account, sends and receives additional messages, adds messaging accounts, and so forth, the messaging account determination module 122 becomes customized to that user 104.

Block 1008 generates a confidence level value for one or more of the plurality of the message accounts based at least in part on the determined correspondence. In one implementation, the confidence level may be based at least in part on a correspondence between one or more message attributes 206 and one or more message account parameters 208. This confidence level may be generated at least in part by assigning different weights to different message attributes 206, message account parameters 208, or both. For example, an association between domain names may be weighed more heavily and count more towards the confidence level than use of a formal salutation in the message content 310.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one network interface device;
   at least one memory storing computer-executable instructions;
   at least one processor configured to access the at least one network interface device and the at least one memory and execute the computer-executable instructions to:
   receive a request to send a message;
   determine a confidence level associated with one or more of a plurality of message accounts;
   when the confidence level satisfies one or more confidence criteria:
   rank at least a portion of the plurality of message accounts by confidence level; present message account indicators designating at least a portion of the plurality of message accounts;
   receive user selection of one of the plurality of message account indicators selecting the designated message account to send the message; and
   send, via the at least one network interface device, the message using the selected one message account.

2. The system of claim 1, the message comprising an email and one or more messaging account parameters comprising data associated with an email service provider.

3. The system of claim 1, further comprising a display and the instructions to present message account indicators comprise instructions to generate an image on the display.

4. The system of claim 1, wherein the instructions to determine one or more confidence criteria are received at least in part from manual input of a user specifying one or more confidence levels associated with selection of a messaging account.

5. The system of claim 1, the instructions to determine the confidence level comprising instructions to:

access one or more message attributes associated with the message;

access one or more message account parameters associated with at least a portion of the plurality of message accounts;

determine a correspondence between at least a portion of the one or more message attributes and the one or more message account parameters; and generate the confidence level for one or more of the plurality of the message accounts based at least in part on the determined correspondence.

6. The system of claim 5, the one or more message attributes comprising one or more of a local-part, a domain, header data, content encoding, or an attachment.

7. The system of claim 5, the one or more message account parameters comprising one or more of a local-part of an address, a domain, an outbound server, or inbound server.

8. A computer-implemented method, comprising:

under control of one or more computing systems, the one or more computing systems configured with specific executable instructions, receiving a request to send a message;

associating one or more of a plurality of message accounts with the message, the associating comprising generating a confidence level based at least in part on a correspondence between a message attribute of the message and a message account parameter of the one or more message accounts; and ranking the one or more of a plurality of message accounts by the confidence level;

presenting the ranked message accounts via a user interface; and receiving a user selection of one of the message accounts.

9. The computer-implemented method of claim 8, the selecting comprising identifying the message account satisfying one or more confidence criteria.

10. The computer-implemented method of claim 8, the associating comprising comparing previously stored data with one or more message attributes of the message.

11. The computer-implemented method of claim 10, the previously stored data comprising a message history, correspondence data, social network data, or a combination thereof.

12. The computer-implemented method of claim 10, the previously stored data comprising information about a prior manual selection of a message account.

13. The computer-implemented method of claim 8, the message comprising an email and the message accounts comprising one or more email boxes, each email box associated with a different email address.

14. The computer-implemented method of claim 8, further comprising sending the message using the selected one message account.

15. One or more non-transitory computer-readable media storing computer-executable instructions that, when executed by at least one processor, configure the at least one processor to perform operations comprising:

accessing one or more message attributes associated with a message prior to transmission;

accessing one or more message account parameters associated with at least a portion of a plurality of message accounts configurable to transmit the message;

determining a correspondence between at least a portion of the one or more message attributes and the one or more message account parameters; and generating a confidence level for one or more of the plurality of the message accounts based at least in part on the determined correspondence; and ranking the one or more of the plurality of the message accounts by the confidence level.

16. The computer-readable media of claim 15, further comprising selecting one of the plurality of the message accounts based at least in part on the confidence level.

17. The computer-readable media of claim 16, further comprising initiating transmission of the message via the selected message account.

18. The computer-readable media of claim 17, the transmission utilizing simple mail transfer protocol (SMTP).

* * * * *

UNITED STATES PATENT AND TRADEMARK OFFICE
CERTIFICATE OF CORRECTION

| | | |
|---|---|---|
| PATENT NO. | : 8,949,353 B1 | Page 1 of 1 |
| APPLICATION NO. | : 13/446505 | |
| DATED | : February 3, 2015 | |
| INVENTOR(S) | : Julien Beguin | |

It is certified that error appears in the above-identified patent and that said Letters Patent is hereby corrected as shown below:

On The Title Page

Insert Item -- (73) Assignee: Amazon Technologies, Inc. Reno, Nevada --

Signed and Sealed this
Twenty-sixth Day of January, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,949,353 B1 | Page 1 of 1 |
| APPLICATION NO. | : 13/446505 | |
| DATED | : February 3, 2015 | |
| INVENTOR(S) | : Julien Beguin | |

It is certified that error appears in the above-identified patent and that said Letters Patent is hereby corrected as shown below:

On The Title Page

Item (76) should be changed to (75)

Insert Item -- (73) Assignee: Amazon Technologies, Inc. Reno, Nevada --

This certificate supersedes the Certificate of Correction issued January 26, 2016.

Signed and Sealed this
Twenty-sixth Day of April, 2016

Michelle K. Lee
*Director of the United States Patent and Trademark Office*